United States Patent [19]
Sumiyoshi et al.

[11] 3,738,193
[45] June 12, 1973

[54] WORKING OIL PRESSURE CONTROL SYSTEM FOR AUTOMATIC TRANSMISSION WITH TORQUE CONVERTERS

[75] Inventors: Masaharu Sumiyoshi, Toyota; Shigeru Sakakibara, Chita-gun, Aichi-ken; Osamu Ito, Toyota, all of Japan

[73] Assignees: Nippondenso Co., Ltd., Kariya-shi, Aichi-ken; Toyota Jidosha Kogyo Kabushiki Kaisha, Toyota-shi, Japan

[22] Filed: Feb. 4, 1972

[21] Appl. No.: 223,476

Related U.S. Application Data
[63] Continuation-in-part of Ser. No. 876,784, Nov. 14, 1969, abandoned.

[52] U.S. Cl. .................. 74/731, 74/752 A, 74/866
[51] Int. Cl. .... F16h 47/00, F16h 3/74, B60k 21/00
[58] Field of Search ............ 74/731, 752 A, 752 D, 74/866

[56] References Cited
UNITED STATES PATENTS

| | | | |
|---|---|---|---|
| 2,949,047 | 8/1960 | Burckhardt | 74/731 X |
| 3,007,351 | 11/1961 | Hilpert | 74/731 X |
| 3,280,657 | 10/1966 | Holdeman | 74/732 |
| 3,397,596 | 8/1968 | Lubinski | 74/731 |
| 3,604,288 | 9/1971 | Mori | 74/731 X |
| 3,667,322 | 6/1972 | Noguchi et al. | 74/731 |
| 3,659,481 | 5/1972 | Espenschied et al. | 74/731 |

*Primary Examiner*—Arthur T. McKeon
*Attorney*—John W. Malley, Paul N. Kokulis, Allen Kirkpatrick et al.

[57] ABSTRACT

A working oil pressure control system to reduce shift shock in automatic transmissions with torque converters wherein, by virtue of the fact that the torque transmitted corresponds to the slip ratio between the torque converter pump and the torque converter turbine, the working or operating oil pressure applied to the friction engaging or clutch and brake means of a gear transmission is controlled so as to decrease when the slip ratio in the torque converter increases and vice versa.

11 Claims, 7 Drawing Figures

PATENTED JUN 12 1973 3,738,193

WORKING OIL PRESSURE CONTROL SYSTEM FOR AUTOMATIC TRANSMISSION WITH TORQUE CONVERTERS

This application is a continuation-in-part of our co-pending application Ser. No. 876,784, now abandoned filed Nov. 14, 1969.

The present invention relates to a working or operating oil pressure control system designed to ensure that the gears are smoothly shifted in automatic transmissions which have torque converters.

In conventional automatic transmissions with torque converters, if there is a large difference between the torque developed by the engine and the torque due to the inertia of the vehicle which is the load when the gears are shifted, an impulsive transmission or consumption of power takes place and a strong (and of short duration, i.e., momentary) spurt of acceleration or deceleration occurs in the vehicle, i.e., the vehicle is shift shocked due to the unbalance of those torques.

In order to eliminate this drawback, systems have generally been used in which the working oil pressure for controlling gear shifts were caused to vary by means of a complicated hydraulic control circuit. For example, a predetermined working oil pressure as produced from a constant pressure valve was changed by using a throttle valve to vary the working oil pressure in accordance with the extent to which the accelerator pedal was moved, or a governor valve was used to cause the working oil pressure to change in accordance with the car speed. Although the predetermined value of oil pressure produced by the constant pressure valve was changed by means of the oil pressure provided by those two valves to suitably determine the value of the working oil pressure, it was difficult to provide satisfactory gear shifts over a wide range of torque variations of the engine and load without any transmission impacts or shift shocks and moreover such prior art transmissions were unsuitable for installation in small-size vehicles and particularly compact or midget cars because they incorporated the complicated hydraulic circuitry to control the working oil pressure which resulted in the increased dimension and weight for these transmissions. These drawbacks are attributable to the fact that the prior art controls were not effected in response to the torque transmitted between the engine and load.

Accordingly, the present invention has for its object the solution of this problem and has the following features: firstly, the working oil pressure is controlled in accordance with the torque transmitted and more particularly, on the ground that the torque transmitted corresponds to the slip ratio between the pump and the turbine in a torque converter, the working oil pressure applied to the friction engaging or clutch and brake means of a gear transmission is controlled in accordance with the slip ratio in the torque converter, and in particular is controlled inversely thereof, i.e., the oil pressure increases when the slip ratio decreases and vice versa.

Secondly, the pressure of the oil produced by an actuating valve to increase the pressure of a constant pressure valve is decreased as the said slip ratio decreases so that the predetermined pressure value for the constant pressure valve is changed to raise the working oil pressure produced by the constant pressure valve.

Thirdly, only one and no more of such actuating valves to change the predetermined value for said constant pressure valve is used to attain the effect of the second feature.

Fourthly, the torque converter slip ratio is translated into the pulse width of recurrent pulses which in turn energize intermittently the solenoid of the actuating valve of the working oil pressure control valve mechanism so that the predetermined value for the constant pressure value for the constant pressure valve of said working oil pressure control valve mechanism is continuously changed according to the integral value of the pressure oil discharged from said actuating valve to thereby decrease the working oil pressure applied to the friction engaging means of a gear transmission in accordance with an increase in the slip ratio.

According to the present invention, such effects as stated in the description to follow are obtainable.

A working oil pressure control system is provided which is most suited for use with vehicles, particularly with compact or midget automobiles, because, as the working oil pressure of the torque converter is controlled in accordance with the slip ratio related to the torque transmitted, any shifting shock or impact due to a variation in the torque which occurs when a shift is made may be eliminated, while providing a sufficient coupling force to the friction engaging means and permitting a speedy shifting.

The provision of compact and light weight automatic transmissions is possible by virtue of a simple hydraulic circuitry attained through a novel arrangement in which the predetermined value for a constant pressure valve is changed by means of a single actuating valve adapted for actuation in response to the slip ratio and changed to the working oil pressure corresponding to the slip ratio.

Further, an automatic transmission with a torque converter is provided which is free from any faults, has a long life and is well suited for use with compact and light automobiles and in which the conversion of slip ratio into pulse width is effected electrically so that the working oil pressure is con-rolled by means of a solenoid valve which is the simplest form of electrical actuators. Still further, the solenoid operated actuating valve and constant pressure valve are combined to cause the actuating valve to perform time modulation action in response to varying pulse widths so that the predetermined value of the oil pressure from the constant pressure valve is caused to change by means of the smoothed oil pressures, from the actuating valve; hence, a working oil pressure control system is provided which is stable in operation, free from any faults and highly reliable and at the same time which has a long life.

Other objects, features and advantages will be readily apparent from the following description with reference to the accompanying drawings, in which.

Construction of automatic transmission with torque converter

Figure 1:
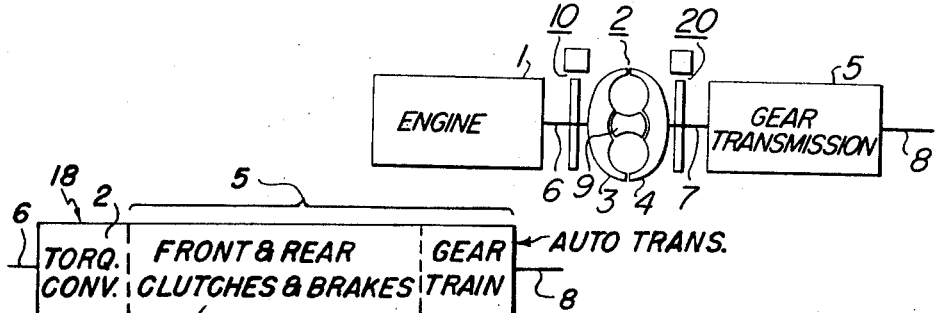
FIG. 1 is a block diagram of an automatic transmission with a torque converter used for incorporating the present invention.

As shown in FIG. 1, a main shaft 6 of an engine 1 is coupled to an automatic transmission including a torque converter 2 and gear transmission 5. The torque converter has its torque converter pump 3 connected to shaft 6 and its torque converter turbine 4 is coupled to gear transmission 5 through a turbine output shaft 7. A torque converter stator 9 is interposed between the pump and the turbine of the torque converter. As is well known in general, and fully detailed in commonly assigned Shirai et al. U.S. Pat. No. 3,572,168, the gear transmission 5 is composed of reduction gearing means consisting of a train of gears (see gear train 50 in that patent) and friction engaging means (such as front and rear clutches and brakes 20, 30, 40 and 60 in that patent) operated by means of working oil under pressure which is supplied for the friction engaging means through a working oil pressure controlling valve mechanism and working oil pressure circuit from an oil pressure source which is not shown. A transmission output shaft 8 transmits torque to vehicle wheels not shown.

An engine rpm pickup 10 is mounted on the main shaft 6 and a torque converter turbine shaft rpm pickup 20 is mounted on the turbine output shaft 7.

Working oil pressure controlling valve mechanism

Figure 2:
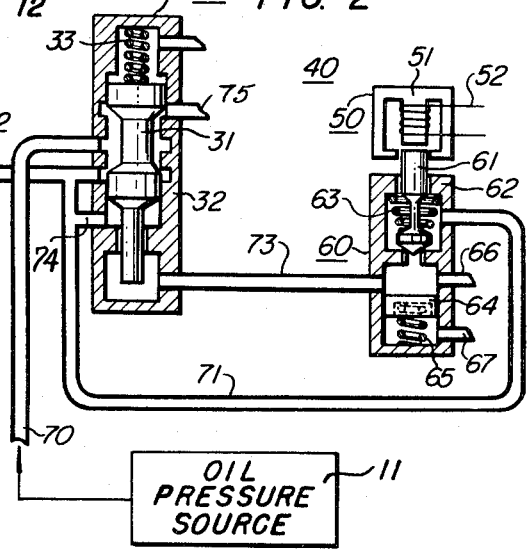
FIG. 2 is a schematic diagram showing a hydraulic circuit of the working oil pressure controlling valve mechanism incorporated in the system according to the present invention.

Oil under pressure, i.e., pressurized oil, is produced as shown in FIG. 2 from an oil pressure source 11, which (as shown by reference number 17 in the above patent) includes gear pump which is driven by the main shaft 6 and the pressurized oil is then supplied to a constant pressure valve 30 through an oil path 70 in the working oil pressure controlling valve mechanism detailed in FIG. 2. From valve 30 the oil which is under a regulatable constant pressure, is supplied through a fluid path 72 to the torque converter 2 and a gear train 12 directly and to the friction engaging (front and rear clutch-and brake) means 13 through a valve or hydraulic actuating circuit 14 when it is turned on by an automatic shift determining circuit 15 or a conventional manual, gear shift stick or lever 16.

Besides the automatic transmission 18 of this invention being constructed for example as the one detailed in FIG. 1 of the above mentioned Shirai et al. U.S. Pat. No. 3,572,168, specifically torque converter 2 and gear train 12 being like the corresponding items 10 and 50 in that patent, the friction engaging means 13 herein refer to for example to the front and rear clutch and brake means 20, 30, 40 and 60 therein. Further, the working oil or hydraulic actuating circuit 14 herein may be constructed like circuit 230 in FIGS 2 or 23 in that patent, while FIG. 7 and related discussion therein sets forth the structural and operating details of the automatic shift determining circuit 15 in FIG. 2 hereof.

The pressurized oil in the oil path 70 of FIG. 2 enters into an actuating valve 40 through an oil path 71 and it is then supplied through an oil path 73 of the actuating valve 40 to the constant pressure valve 30 to change the predetermined value of oil pressure. The constant pressure valve 30 is composed of a valve spindle 31, valve body 32 and a spring 33 with the pressure oil entering it through an outlet into oil path 72. Part of the incoming pressurized oil flows into a drain 75 while a portion of the oil discharged into path 72 is connected via path 74 to urge valve spindle 31 upward against the opposing action of the spring 33 and regulates to reduce the oil pressure (working oil pressure) of the oil delivered from the oil path 72. Hence, the working or operating oil pressure in path 72 is stablizied at a state where the downwardly acting force of the spring 33 and the upwardly urging force of the valve spindle 31 are in equilibrium, causing the working oil pressure to be maintained at a constant value.

As oil flows under a predetermined normal pressure from valve 40 ( in a manner below explained) through the oil path 73, into the constant pressure valve 30, the resulting additional force urges valve spindle 31 upward against the action of spring 33, much with the same effect as though spring 33 were replaced with a weaker spring, whereby the working oil pressure is reduced to its normal maximum value required by transmission 18 (e.g., 10 kg/cm$^2$) and kept constant thereat until the pressure in line 73 is changed.

The solenoid operated actuating valve device 40 in FIG. 2 is composed of solenoid 50 and actuating valve 60. The solenoid 50 includes a core 51 on which a coil 52 is wound so that when the coil is energized, the core 51 attracts a valve spindle 61 to open valve 60, whereas the valve 60 closes upon deenergization of the coil.

The valve 60 is composed of a valve spindle 61, a valve body 62, a smoothing valve spindle 64 and springs 63 and 65. Although the valve spindle 61 is shown here as a needle valve, there is no intention to specifically limit the invention thereto since any kind of valve spindle may be employed as long as it can close and open the valve. The valve spindle 61 is normally pressed downward by spring 63 and the upper portion of valve spindle 61 is utilized as a moving core. The smoothing valve spindle 64 is normally urged upward by spring 65 which yields allowing valve spindle 64 to go down when actuating oil enters into the chamber portion above spindle 64. Conversely, the spindle goes up when the flow of the actuating oil stops. The movement of the smoothing valve spindle 64 is restricted by means of an orifice 67 to be inoperative with respect to any variation in the oil pressure which exceeds a certain period; below this period, however, the spindle 64 may respond to variations in the oil pressure of the actuating oil to reduce the variations in the oil pressure of the actuating oil so that the stable actuating oil is supplied to the constant pressure valve 30 corresponding to the slip ratio. An upper orifice 66 is provided to cause the drain of a portion of the oil above spindle 64 to reduce the pressure of the oil entering into oil path 73. The lower orifice 67 provides a passage way for air or oil accumulated below valve spindle 64 and produces a resistance to the up and down movement of the valve spindle 64 to ensure a more satisfactory smoothing action.

The oil pressure of the actuating oil in oil path 73, and hence the pressure of the working oil in path 72, may be changed by varying the energizing and deenergizing times of solenoid 50, i.e., the ratio of the opening time to the closing time valve 60. This is accomplished as detailed below by varying the pulse width of recurrent periodic pulses applied to solenoid 50. The smoothing valve spindle 64 and the spring 65 smooth out variations in the oil pressure of the actuating oil. Assuming that this slip ratio of torque converter increases causing wider width pulses to solenoid 50 and holding valve spindle upward (open) longer per pulse to cause an increased actuating oil pressure in line 73, the actuating oil acts on the constant pressure valve 30 to reduce the working oil pressure of the working oil delivered from oil path 72 to, for example, 4 kg/cm². Thus, pressurized oil having a suitable working pressure falling between 10 to 4 kg/cm² may be supplied from oil path 72. Of course, valve 64 (and spring 65) need not be installed if the additional smoothing function thereof is not desired or essential.

RPM pickups

Figure 3:
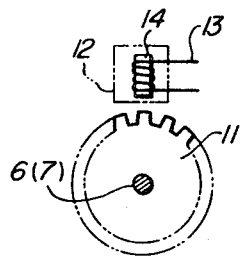
FIG. 3 is a schematic view showing the construction of a rpm pickup used in the system according to the present invention.

The rpm pickups 10 and 20 may be similar to those in the above mentioned patent and as shown in FIG. 3 are composed of a disk 11 connected to the main shaft 6 or the turbine output shaft 7 and a sensor 12. The disk 11 is a toothed disk formed with a plurality of circumferential protrusions. The sensor 12 is composed of a magnet 14 having a winding 13 wound thereon and voltage is produced in the winding 13 by means of variations in the leakage flux caused as the protrusions of the disk 11 come close to and move away from the magnet 14. This voltage is obtained in the form of a pulse whose frequency corresponds to the number of revolutions of the main shaft 6 or the turbine output shaft 7 multiplied by the number of teeth of the disk 11.

Of course, the rpm pickups 10 and 20 will not be limited to those shown by way of an example and any pickups may attain the desired results of the present invention satisfactorily provided that they produce electrical outputs in response to the number of revolutions.

Slip ratio-pulse width conversion circuit

As explained in connection with the description of the working oil pressure controlling valve mechanism, when applying pulses to solenoid 50, the pulse width of these pulses may be changed so as to cause the working oil pressure of the actuating oil to vary continuously. In this instance, a slip ratio-pulse width conversion circuit for changing the pulse width according to the slip ratio is explained below with reference to FIG. 4.

The outputs from the rpm pickups 10 and 20 are applied to rpm operational circuits 110 and 120, respectively, whose outputs are then converted respectively to a DC voltage $[N_1]$ proportioned to the rpm $N_1$ of the engine main shaft 6 and a DC voltage $[N_2]$ proportioned to the rpm $N_2$ of the torque converter turbine output shaft 7. The rpm operational circuits 110 and 120 are composed of an amplifier circuit, an amplitude limiting circuit which produces a voltage of constant amplitude, and a frequency-DC voltage conversion circuit (all as described in the above patent relative to FIG. 9 thereof) although they may take any other forms. The DC voltages $[N_1]$ and $[N_2]$ are then applied to slip ratio operational circuit 200 which may be of conventional construction for producing a voltage representing the ratio of the two voltages or it may be constructed as explained below relative to FIG. 7. The output from the slip ratio operational circuit 200 in FIG. 4 produces a voltage corresponding to the slip ratio $S$ ($S = N_2/N_1 = [N_2/N_1]$), where the values in the brace indicate the corresponding values converted to voltage. Unless otherwise specified, the outputs from the circuit are explained hereinafter as being positive voltages, but this should not be taken as limitative in any way. The output from a sawtooth oscillator circuit 140 is a sawtooth wave T (FIGS. 5 and 6) having a constant crest value which repeats at a constant and much shorter interval (repetition period) than the gear shifting time of the automatic transmission 18 containing torque converter 2. As shown, each cycle of the sawtooth waveform T increases its voltage amplitude linearly with time as is conventional. Oscillator circuit 140 may be any type of sawtooth oscillator known to the prior art.

Figure 4:
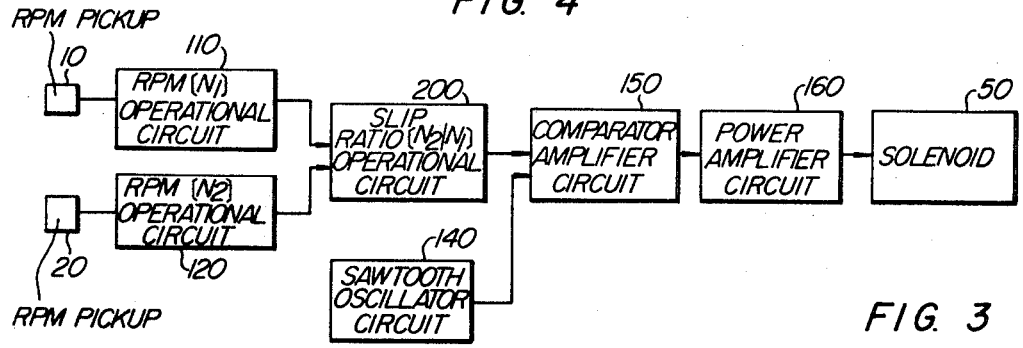
FIG. 4 is a block diagram of a slip ratio-pulse width conversion circuit used with the system of the present invention.
Figure 5:
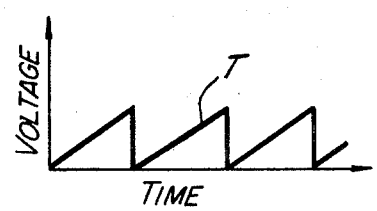
FIG. 5 is a diagram showing the output voltage waveform of the sawtooth oscillator circuit in the block diagram of FIG. 4.
Figure 6:
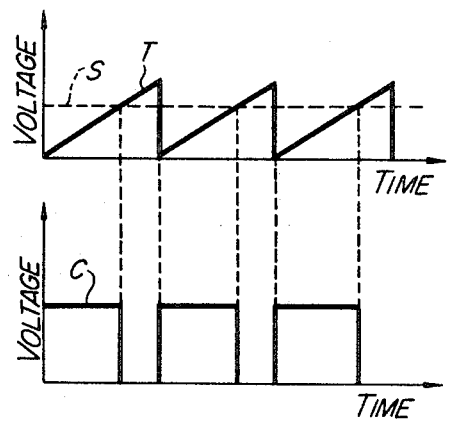
FIG. 6 is a diagram showing the waveforms of the input and output voltages of the comparator amplifier circuit in the block diagram of FIG. 4.

So further shown in FIG. 4 the sawtooth wave voltage and the voltage corresponding to the slip ratio $S$ are applied to a comparator amplifier circuit 150 where they are compared with each other, and as shown in FIG. 6 the positive constant voltage output C of the comparator amplifier circuit 150 is continuously produced until the sawtooth voltage T as it builds up with time exceeds the voltage of slip ratio $S$. Then the comparator amplifier circuit 150 stops producing its output the instant the voltage of sawtooth wave T becomes larger than that of the slip ratio $S$. The comparator amplifier circuit 150 is composed of a conventional differential amplifier followed by a conventional amplifier circuit. The variable width pulse output of the comparator amplifier circuit 150 is amplified by means of a power amplifier circuit 160 and applied to the solenoid 50. Assume, for example, that $N_1$ is 1,000 rpm and $N_2$ is 800 rpm, that is, the slip ratio is 0.8. If such is the case, the Dc voltages $[N_1] = 1$ volt and $[N_2] = 0.8$ volt are then the outputs produced by the rpm operational circuits 110 and 120, respectively. The output of the slip ratio operational circuit 200 is then expressed as $N_2/N_1 = (0.8/1)$ volt, that is, the output is 0.8 volt. If the recurrence frequency of the sawtooth oscillator circuit 140 is 50 Hz as its peak value of 1 volt, the pulse output of the comparator amplifier circuit 150 occurs at a repetition rate such that the positive voltage of C appears for 16ms (milliseconds) and disappears for 4ms. The pulses amplified by the power amplifier circuit 160 repeat the process in which current is supplied to the solenoid 50 for 16ms and cut off for 4ms. Thus, the actuating valve 40 cuts off the pressure oil for 4ms and the actuating oil from the actuating valve 40 drops by 20 percent the working oil pressure. In other words, the oil pressure in line 73 (FIG. 2) from actuating valve 40 is produced in proportion to the pulse width and the oil pressure of the pressurized oil in line 72 from the constant pressure valve 30 is thus reduced to 80 percent. In this way, the actuating valve 40 is adapted to control the working oil pressure ranging between the above stated exemplary maximum and minimum pressures of 10 kg/cm² and 4 kg/cm². The relation between the slip ratio $S$ and the oil pressure $P$ of the pressurized oil produced in line 72 by the constant pressure valve 30 is expressed as $P \approx 10 - 6S$, and hence the oil pressure $P$ decreases as the slip ratio $S$ increases, and vice versa, i.e., the working oil pressure is varied inversely to changes in the slip ratio. Of course, the slip ratio $S$ and the oil pressure $P$ need not be in a linearly proportioned relation with each other it will be sufficient if there is a certain inverse relationship between them which is determined by the characteristics of the engine, vehicle, torque converter or the like.

Slip ratio operational circuit

Figure 7:
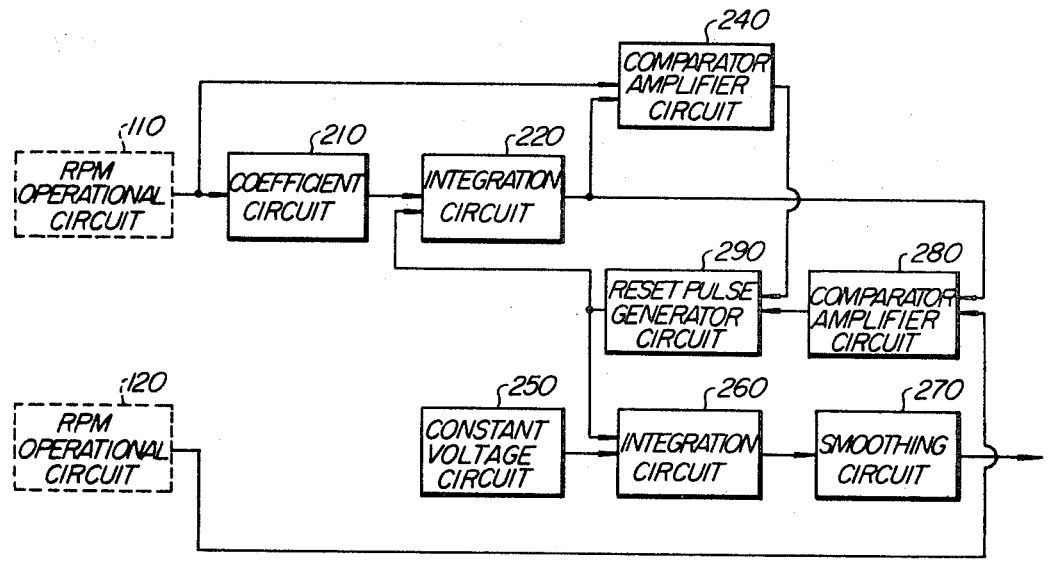
FIG. 7 is a block diagram of the slip ratio operational circuit in the block diagram of FIG. 4

By way of example, the slip ratio operational circuit 200 in FIG. 4 may be constructed as shown in FIG. 7 which is per se claimed in the copending Ito application Ser. No. 41,293 now U.S. Pat. No. 3,673,400 filed May 28, 1970. A coefficient circuit 210 (a potentiometer may be employed for the purpose) changes the output voltage of the rpm operational circuit 110 into a voltage of 1 $n$th. In this instance, $n$ may be 100 or 1,000, for example. If $n$ is 100, the slip ratio may be calculated to be correct to two significant figures, whereas the number of such significant figures will be three if $n = 1,000$. Of course, n may take any arbitrarily determined value. Comparator amplifier circuits 240 and 280 are so-called differential amplifiers which are known to the prior art. An integration circuit 260 (an amplifier circuit in which a capacitive feedback is provided) integrates the output voltage of a constant voltage circuit 250. An integration circuit 220 has the same construction as the integration circuit 260 and integrates the output voltage of a coefficient circuit 210. The output voltages of the integration circuit 220 and the rpm operational circuit 120 are applied to the comparator amplifier circuit 280 and the output voltage is produced when the voltage of the former circuit exceeds that of the latter. The output voltage of the comparator amplifier circuit 280 is supplied to a reset pulse generator (for example, a one-shot multivibrator may be employed) which in turn produces a pulse of a constant time duration (a short time duration). The output voltage of the reset pulse generator circuit 290 is applied to the integration circuits 220 and 260 to reset the integrating operations (which means that the integrating operations are stopped and the initial conditions are set to zero voltage). As the output voltage of the reset pulse generator circuit 290 is produced, the output voltages of the integration circuits 220 and 260 diminish into zero and as the output of the circuit 290 dissipates the integrating circuits 220 and 260 start the integrating operations thereof. The outputs of the rpm operational circuits 110 and the integrating circuit 220 are applied to the comparator amplifier circuit 240. The instant the both voltages balance each other, the amplifier 240 produces an output voltage which is applied to the reset pulse generator circuit 290 to produce a reset pulse. The reason is that in the case where $[N_1] \leq [N_2,]$ $[N_1]$ is compared instead of $[N_2]$ to reset so that whenever the slip ratio is larger than 1, it is calculated as 1. This is advantageous in that the working oil pressure control system may be satisfied as far as the result of calculation of $S = 1$ is always 1. The output of the integrating circuit 260 is converted into a DC voltage by a smoothing circuit 270 (for example, a low pass filter may be employed).

With the construction described above, the operation of the control system according to the present invention will be explained hereinafter. The output voltage $[N_1]$ of the rpm operational circuit 110 is changed into 1 $n$th of the voltage by the coefficient circuit 210 whose output voltage is represented as $[N_1/n]$. This output voltage $[N_1/n]$ is then integrated by the integrating circuit 220, that is, the process of integration is performed to produce $K' \int [N_1]/n \, dt$. Here, $t$ is time in second and $K'$ is the integrator coefficient. The output voltage of the integrating circuit 220 is compared with the output voltage $[N_2]$ of the rpm operational circuit 120 in the comparator amplifier circuit 280 which in turn produces an output voltage when comparison is found $K' \int [N_1]/n \, dt, = N_2$ This output voltage resets the integrating circuit 220. In other words, this determines the integration range $Tc$ which converts the indefinite integral to the definite integral and the integrating circuit 220 calculates the integral $$K' \int_0^{Tc} \frac{[N_1]}{n} dt = K' \frac{[N_1]}{n}$$

Note that $Tc$ here should preferably be preset to be such a short time that the value for $[N_1]$ may be regarded as a constant. The constant voltage circuit 250 produces a constant voltage $[C]$ and the integrating circuit 260 calculates the integral $K'' \int [C] dt$. Note that $K''$ is the integrator constant which need not be the same with that of the integrating circuit 220. The integration range $Tc$ determined by the output from the reset pulse generator circuit 290 is supplied to the integrating circuit 260 which performs the process of integration to give $$K'' \int_0^{Tc} [C] dt = K''[C]Tc.$$

Since it is already known by the calculation of the comparator amplifier circuit 280 that there is a relation $$K' \int_0^{Tc} \frac{[N_1]}{n} dt = [N_2],$$

the instant the comparator amplifier circuit 280 produces an output voltage, there holds a relation $K' [N_1]/n \, Tc = [N_2]$ or $TC = [N_2]/[N_1] \, n/K'$. Substituting this in the above equation $$K'' \int_0^{Tc} [C] dt = K''[C]Tc$$

the output voltage of the integrating circuit 260 is given $K'' [C] Tc = K'' [C] [N_2]/[N_1] \, n/K' = (K''n [C])/K' [N_2]/[N_1] = K [N_2]/[N_1] = K [S] = KS$ where $K = K''/K' [C]n$ is a constant. In other words, the peak value of the output voltage from the integrating circuit 260 represents the voltage proportioned to the slip ratio $S$. Thus, the DC voltage $[S]$proportional to the peak value of the output voltage from the integrating circuit 260 represents the voltage which is proportioned to the slip ratio $S$.

By way of an example, if $N_1 = 1,000$ rpm and $N_2 = 830$ rpm, then $S = 0.83$. In this calculation if $[N_1] = 1$ volt, $[N_2] = 0.83$ volt, the output of the coefficient circuit 210 is given 0.01 volt (where $n = 100$) and the output of the integrating circuit 220 will become equal to the value of $[N_2]$ when there holds a relation $[N_2] = K'/n \, [N_1] \, T$ and subsequently a relation $T = 1/K' \, 0.83/0.01 = 83/K'$; and if $k' - 100$ (1/sec), then $T = 0.83$ m sec. If then $K'' = K' = 100,000$ (1/sec) and $[C] = 0.01$ volt, then the output of the integrating circuit is given $K'' [C] T = 100,000$ (1/sec) $\times$ 0.01 volt $\times$ 0.83 ms = 0.83 volt.

Namely, the voltage having the same numerical value as the slip ratio 0.83, is taken as the output of the integrating circuit 260 and the output voltage of the smoothing circuit 270 is the proximity of 0.83 volt. In other words, the slip ratio which is correct to two significant figures may be obtained as the voltage output of the slip ratio operational circuit 200. In this manner, the calculation of slip ratio is effected with a time lag of less than 0.01 second in response to the independently varying values of the rpm $N_1$ and $N_2$ of the engine main shaft 6 and the torque converter turbine output shaft 7, respectively. The said time lag is so short as compared to the variations in the rpm $N_1$ and $N_2$ of the main shaft 6 and the turbine output shaft 7, it may be considered that the calculation is effected with almost no time lag.

Although the slip ratio operational circuit has been described by way of an example, there is no intention to specifically limit it to the construction described above and the calculation may be made by means of a digital computation and moreover a divider circuit employing Hall elements or the like may be employed.

Thus the DC output voltage of smoothing circuit 270 in FIG. 7 is the slip ratio representative voltage of the slip ratio operational circuit 200 in FIG. 4 that is applied to the comparator amplifier circuit 150 of the slip ratio-pulse width conversion circuit shown in FIG. 4. As previously indicated, it is there compared in circuit 150 with the output voltage of the sawtooth oscillator circuit 140 which produces a sawtooth wave having a constant crest value. Accordingly, when the slip ratio in the torque converter is high, the pulse width for the output voltages of the comparator amplifier circuit 150 and of the power amplifier 160 is increased and the energizing time of the solenoid 50 is extended. For this reason, in the working oil pressure controlling valve mechanism shown in FIG. 2, the relative time during which the valve spindle 61 remains in its upper position is lengthened and the pressure of the oil in the oil path 73 is thereby increased to reduce the working oil pressure of the pressurized oil supplied from oil path 72 to the automatic transmission 18 including friction engaging means 13 of the gear transmission 5 when permitted by actuating circuit 14 during gear shifting times. Consequently, if the slip ratio is high and the torque transmitted by the torque converter is small, the pressure of the working oil in path 72 is low and the friction engaging means engage loosely during shift, but on the other hand, if the slip ratio is low and the torque transmitting force of the torque converter is large so that the oil pressure in path 72 is high, the friction engaging means engage intensely during shift, whereby the acceleration or deceleration of the vehicle at the time of gear shifting may be decreased on the whole. It is to be understood that it is not the slip ratio changes in the oil pressure from path 72 that cause gear shifting, but that those changes reduce if not eliminate shift shock during the gear shifting otherwise caused upon operation of the hydraulic actuating circuit 14 by manual shift lever 16 or the automatic shift determining circuit 15 to allow the working oil through circuit 14 to the clutches and brakes 13 in the exemplary manner explained in the above mentioned U.S. Pat. No. 3,572,168. Circuits 14 and 15 and lever 16 determine which of those clutches and brakes is or are engaged or disengaged to change the meshing engagement of the gears in the gear train 12 to effect a shift up or shift down in the gear ratio as discussed in that patent. The speed of operation of the hydraulic actuating circuit 14 is controlled by the working oil pressure in path 72 as well as the force of engagement of the friction means 13. Therefore, control over that pressure in accordance with this invention in the manner above described makes it possible to decrease or prevent the prior art spurts of vehicle acceleration or deceleration caused by engine and vehicle inertia torque unbalance or discontinuous rotation occurring at the time of engagement or disengagement of the friction engaging means 13.

We claim:

1. An oil pressure control system for use with an oil pressure source and in combination with an automatic transmission of the type having a torque converter comprising:
   a torque converter having a torque converter pump and a torque converter turbine operable at a variable slip ratio between said pump and turbine,
   a gear transmission operatively connected to said converter and having friction engaging means,
   means operatively connected to said gear transmission and including a regulatable oil pressure controlling valve mechanism for supplying oil from said source via said pressure controlling valve mechanism to said automatic transmission to apply oil to said friction engaging means of said gear transmission with a given operating pressure,
   means for producing electrical pulses having widths varying in correspondence to said variable slip ratio, and
   regulating means operatively connected to said valve mechanism and responsive to pulse width variations in said pulses for changing the value of said given pressure of the oil supplied by said valve mechanism to said friction engaging means inversely with changes in said slip ratio.

2. A system as in claim 1 wherein said valve mechanism includes a regulatable constant pressure valve and said regulating means comprises an actuating valve connected to said constant pressure valve and electrical control means for intermittingly opening and closing said actuating valve in accordance with said pulse widths to control the oil admitted to said constant pressure valve from said actuating valve and thereby to control the valve of said given pressure of the oil supplied from said constant pressure valve.

3. A system as in claim 1 wherein said electrical pulse producing means includes a slip ratio pulse width conversion circuit including slip ratio operational circuit means for producing a voltage varying in amplitude in accordance with said variable slip ratio,
   a sawtooth oscillator circuit, and
   a comparator circuit means for comparing the output of said operational circuit and said oscillator circuit to produce said varying width electrical pulses.

4. An oil pressure control system for use with an oil pressure source and an automatic transmission of the type having a torque converter, which operates with a variable slip ratio between its pump and turbine, and having friction engaging means, said system comprising:
   means including a regulatable oil pressure controlling valve mechanism for supplying oil from said source via said oil pressure controlling valve mechanism to said transmission to apply oil to said friction engaging means with a given operating pressure,
   means for producing pulses having widths varying in correspondence to said variable slip ratio, and
   regulating means operatively connected to said valve mechanism and responsive to pulse widths variations in said pulses for decreasing the value of said given pressure of the oil supplied to said automatic transmission in response to an increase in said slip ratio.

5. An oil pressure control system for use with an oil pressure source and an automatic transmission of the type having a torque converter, which operates with a variable slip ratio between its pump and turbine, and having friction engaging means, said system comprising:
   means including a regulatable oil pressure controlling valve mechanism for supplying oil from said source via said oil pressure controlling valve mechanism to said transmission to apply oil to said friction engaging means with a given operating pressure and
   regulating means connected to said valve mechanism for increasing and decreasing the value of said given oil pressure respectively in response to decreases and increases in said slip ratio.

6. The improvement in claim 5 wherein
   said controlling valve mechanism includes a regulating means having an outlet supplying oil as aforesaid and having one inlet receiving oil from said source and having a second inlet, and
   said regulating means includes an actuating valve having an outlet connected to said second inlet of said constant pressure valve and having an inlet operatively connected and disconnected internally to said actuating valve outlet by opening and closing of said actuating valve and externally connected to said outlet of said constant pressure valve for receiving oil under pressure therefrom,
   said regulating means further including means for opening and closing said actuating valve.

7. The improvement in claim 6 wherein said actuating valve opening and closing means includes control means for repeatedly opening said actuating valve at a constant repetition period and for interveningly closing the actuating valve each time after the open duration thereof has lasted for a time which increases in response to slip ratio increases and decreases in response to slip ratio decreases, and wherein
   said constant pressure and actuating valves further include means for causing the mean oil pressures at the respective said outlets thereof to vary inversely of each other.

8. The improvement in claim 7 wherein said control means includes solenoid means for operating said actuating valve and further includes means connected to said solenoid means for producing therefor an electrical pulse during each said constant repetition with a width corresponding to said variable slip ratio, said pulse producing means comprising:
   slip ratio operational circuit means for producing an output voltage varying in amplitude in accordance with said variable slip ratio;
   sawtooth oscillator circuit means for repeatedly producing at said constant repetition period an output voltage increasing an amplitude with time, and
   comparator circuit means connected to said slip ratio operational circuit means and said sawtooth oscillator circuit means for comparing the output voltages thereof to periodically produce said electrical pulses with widths of increased duration for increased slip ratios and of decreased duration for decreased slip ratios.

9. In an oil pressure control system for use with an automatic transmission of the type having friction engaging means in a gear transmission connected to a torque converter which operates with a variable slip ratio between its pump and turbine, said system being of the type having means including an oil pressure controlling valve mechanism for supplying oil from a pressure source via said oil pressure controlling valve mechanism to said transmission to apply oil to said friction engaging means with a given operating pressure, the improvement comprising:
   means for producing pulses having widths varying in correspondence to said variable slip ratio, and
   regulating means responsive to pulse width variations in said pulses for regulating said valve mechanism to effect a change in the value of said given pressure of the oil supplied by said valve mechanism to said automatic transmission inversely with changes in said slip ratio.

10. An oil pressure control system for use with an oil pressure source and in combination with an automatic transmission to prevent shift shock therein comprising:
    a torque converter having a torque converter pump and a torque converter turbine operable at a variable slip ratio between said pump and turbine,
    means operatively connected to said automatic transmission and including a regulatable oil pressure controlling valve mechanism for supplying oil from said source via said pressure controlling valve mechanism to said automatic transmission to apply oil to said transmission with a given operating pressure,
    means for producing electric pulses having widths varying in correspondence to said variable slip ratio, and
    regulating means operatively connected to said valve mechanism and responsive to pulse width variations in said pulses for changing the value of said given pressure of the oil supplied by said valve mechanism to said transmission inversely with changes in said slip ratio.

11. An oil pressure control system for use with an oil pressure source and an automatic transmission of the type having a torque converter, which operates with a variable slip ratio between its pump and turbine, said system comprising:
    means including a regulatable oil pressure controlling valve mechanism for supplying oil from said source via said oil pressure controlling valve mechanism to said transmission to apply oil thereto with a given operating pressure, and
    regulating means for causing the value of said given oil pressure to decrease when said slip ratio increases and vice versa.

* * * * *